United States Patent [19]

Seale et al.

[11] Patent Number: 5,492,756

[45] Date of Patent: Feb. 20, 1996

[54] KENAF CORE BOARD MATERIAL

[75] Inventors: Roy D. Seale; Terry Sellers, Jr.; Marty J. Fuller, all of Starkville, Miss.

[73] Assignee: Mississippi State University, Miss.

[21] Appl. No.: 279,187

[22] Filed: Jul. 22, 1994

[51] Int. Cl.$^6$ ................................. B32B 5/16; B27N 3/00
[52] U.S. Cl. ...................... 428/326; 428/338; 428/339; 428/411.1; 428/507; 428/526; 428/533; 428/323; 264/115; 264/122; 156/62.2; 156/275.5
[58] Field of Search ..................... 428/323, 326, 428/338, 339, 524, 526, 532, 533, 411.1, 507; 264/128, 319, 347, 115, 122; 156/275.5, 313, 62.2

[56] References Cited

U.S. PATENT DOCUMENTS

| | | | |
|---|---|---|---|
| 3,927,235 | 12/1975 | Chow | 428/302 |
| 5,334,445 | 8/1994 | Ruyter et al. | 428/284 |

OTHER PUBLICATIONS

SU 1790488, Jan. 23 1993, Russia (with English language translation).

"Manufacture of Ceiling Boards on a Small Industrial Scale Using Kenaf Pulp as Fibrous Material", Tri Ngatijo et al., *Berita Selulosa*, Sep. 1990, vol. XXVI, No. 3, (Translation of Indonesian Journal Article).

"Kenaf for Hardboards", M. O. Bagby et al., *Comm. Assignment Rep.* (TAPPI), vol. 67, pp. 9–13, 1976.

T. Sellers, Jr. et al., *Forest Products Journal*, vol. 43, Jul./Aug. 1993, pp. 69–71, "Kenaf Core as a Board Raw Material".

S. W. Neill et al., 1990 Kenaf Variety Trial Mississippi Agricultural & Forestry Experiment Station (NAFES), Information Sheet No. 1330, pp. 1–3, Mar. 1991.

S. W. Neill et al, 1989 Kenaf Variety Trial, Mississippi Agricalatural & Forestry Experiment Station, (MAFES), Information Sheet No. 1326, pp. 1–5, Apr. 1990.

M. E. Kurtz et al, Tolerance of Kenaf to selected Herbicides Applied Preemergence and Postemergence, Mississippi Agricultual & Forestry Experiment Station (MAFES), Information Sheet No. 1325, pp. 1–4, Apr. 1990.

Agricultural Research Service, US Department of Agriculture, Kenaf Paper: A Forest–Saving Alternative, vol. 36, No. 9, pp. 6–8, Oct. 1988.

Regina Broadway, Researchers High on Potential of Kenaf, Mississippi Agricultural and Forestry Experiment Station (MAFES), Research Highlights, vol. 52, No. 11, pp. 1–2, Nov. 1989.

*Primary Examiner*—Patrick J. Ryan
*Assistant Examiner*—Marie R. Yamnitzky
*Attorney, Agent, or Firm*—Oblon, Spivak, McClelland, Maier & Neustadt

[57] ABSTRACT

Low-density press board material is prepared by particulate kenaf core raw material and a cold-set, thermosetting or thermoplastic binder. The compressed and cured material exhibits dimensional stability, acoustical and thermal insulative properties and related characteristics roughly equivalent to some currently available wood and wood-substitute materials. The surfaces of the kenaf core board can be upgraded with the addition of overlays.

13 Claims, No Drawings

KENAF CORE BOARD MATERIAL

FIELD OF THE INVENTION

This invention relates to board and board compositions prepared from kenaf core material and binder. More specifically, low-density press board prepared from particulate kenaf core in a board with a cured binder which is useful as a low-density panel for sound absorption, thermal insulation and the like. Overlays may be provided for decorative and structural purposes.

BACKGROUND OF THE INVENTION

Kenaf (*hibiscus cannabininus*) is an annual fibrous, non-wood plant, lignocellulosic material, originally native to the East Indies, but now widely cultivated. The plant grows quickly to a height of as much as 5.5 m (18 ft.). The plant is comprised of two distinct fiber types—outer bast fibers and an inner core material. The core comprises 60–75 percent of the plant by weight.

The bast fiber has historically found application as cordage, and in the manufacture of canvas. It is now being considered for use as a source for paper manufacture. To use the bast fiber, it must be separated from the core. This is conventionally done through the use of conventional forage harvesters which chop bulk kenaf into lengths of 3–5 inches which comprise both bast and core. The bast and core are typically packaged using conventional module builders, the modules then being fed into a processing plant, which breaks the module open, passing into a conventional separation cylinder—a large rotating drum with a series of screens and baffles. As the bast is the lighter of the two fractions, it remains within the separation cylinder. The core material falls through openings in the screens onto a conveyer for recovery and use.

A modification of this process is described in U.S. application Ser. No. 08/393,824, copending herewith, by inventors Fuller, Pote and Chen. Additionally, a newly developed process, using kenaf stalks of substantial length, is disclosed in copending U.S. application Ser. No. 08/261,978. Both applications are incorporated herein by reference. The method of separating the bast from the core does not constitute an aspect of the invention of this application, per se.

Press board, strand board, and other materials made out of wood processing residues, or particulate wood materials, constitute a large industry in the United States which competes with the paper industry for pulp wood materials and the like. Additionally, the raw wood materials employed in this industry are replaced only slowly, and are subject to competitive pressure from a variety of commercial markets. Low, medium and high-density materials are commonly employed as acoustical insulation, thermal insulation, decorative panels, structural panels and the like. These materials are conventionally prepared using lignocellulosic particulate materials such as wood, a binder such as novalak or resole resin, and one or more additives, such as a wax, colorant, etc. The board is often prepared by loading the materials into heated presses, and hot pressing the materials under pressure at a temperature sufficient to cure the synthetic or natural based binder or loaded in a form for a sufficient time to cure (with or without heat) cold-set binders. Physical dynamics, as well as water absorbency characteristics are important properties considered.

Accordingly, it remains an object of the industry to provide lignocellulosic, non-wood material for low-density press board and the like. Additionally, it remains an object of the industry to find a suitable commercial use for kenaf core separated from the bast outer fiber.

SUMMARY OF THE INVENTION

These goals, and others more fully set forth hereinbelow, are met by the provision of press board material made from particulate kenaf core material. The particulate material is treated with a binder, such as phenol-formaldehyde resin, or other suitable binder, and hot pressed at suitable pressures, to give panels having a density on the order of 240 kg/m$^3$. The resulting materials exhibit good physical dynamics, and reasonable dimensional stability properties upon water immersion. The materials may be provided, using conventional technology, with laminates and other facings to provide both decorative and functional characteristics. These low-density panels perform as well, or better, than conventional wood-based products, as well as other competitive products, as acoustical and thermal insulation and other upgraded functional applications by using surface overlays of linoleum, plastic, textiles, paper, wood, asphalt or metal.

DETAILED DESCRIPTION OF THE INVENTION

The low-density boards and panels of the claimed invention are prepared from two essential materials, kenaf core and a thermosetting binder or resin. Additional materials may be incorporated in the board composition, such as waxes, colorants, stabilizers and the like, and additionally, the core materials may have adhered thereto facings, laminates and the like. The basic elements of the invention remain, however, particulate kenaf core material and a binder.

The kenaf core material is prepared as described above. Raw particle size can vary, depending on the size of the screen or separating apparatus employed. Conventional, currently available kenaf core provides raw particles of about 1–15 mm average diameter, of various lengths up to about 50 mm. The raw material may be used as a starting material, or can be sized for material as small as flour, or anywhere in between. In general, the particles must have dimensions smaller than about 25 mm by 100 mm (1 in. by 4 in.).

The particles are provided with a coldset, thermosetting or thermoplastic binder. The binder resin is applied through conventional means, such as a atomized spray or spinning discs, through soaking and collection, or by direct addition to the particulate material assembled for the former press. Virtually any thermoset, thermoplastic or cold-set binder conventionally used in connection with lignocellulosic materials can be used including recyclable thermoplastic materials. Principal thermoset binders include phenol-formaldehyde, urea formaldehyde, and urea-phenolformaldehyde condensation products. Additionally, isocyanate binders such as methylene diphenylmethane diisocyanate (MDI) can be employed. Thermoplastic binders include polyester, polyethylene, vinyls, and recycled plastics. Among cold-set binders are silicates, cements, protein-based, carbohydrate types and catalyzed synthetic resins. The binders chosen will be selected on the basis of the ultimate application of the board. For example, if the board is intended to be subjected to extreme environmental conditions under which one binder will not suitably endure use, an alternate binder may be substituted.

Depending on the binder, and density of the end-use product, on average the binder will constitute 2–15 percent based on the weight of the dry kenaf material. Preferably for low-density panels, the binder will constitute 2–10 percent by weight. The actual weight percentage will depend principally on the binder. Additives such as waxes, colorants, stabilizers and the like will be included in amounts no more than 5 percent by weight.

Actual density will vary depending on the particulate size of the material, the binder, and pressures employed. The material is suitable for relative low-density preparations. Although actual values are not critical, densities, at a moisture content value of no more than 10 percent, will range from 200–300 kg/m$^3$. A particular preferred range is 225–275 kg/m$^3$.

The resulting materials are water absorbent. Although the material absorbs up to 325 percent, by weight, on 24 hours of soaking, even wet, the material exhibits acceptable modulus and dimensional stability. Swell values, after 24 hours of soaking, are generally no more than about 25 percent. In situations where water absorption presents a problem, water absorption can be reduced through coating with water-impermeable materials, through addition of hydrophobic elements to the binder, either as a separate chemical constituent, or by grafting hydrophobic functional groups onto the resin backbone, and by providing water-resistant facings on the exposed surfaces of the panel. This latter method can be effectively achieved through conventional processes, which adhere strip laminates or facings to the board after formation of the board, by application of adhesive therebetween.

Although the product of this invention is suitable for use in any low-density board or panel application, particular uses include situations where acoustical or thermal insulation is desired and where floor resiliency or cushioning is needed, such as for athletic floor substrates. As noted, where the panel is subject to user's viewing and enhanced surface-qualities are desired, the panel may be rendered aesthetically more pleasing and upgraded in surface qualities by the application of a facing (papers, textiles, plastics, vinyl composition tiles, wood veneers, and the like) thereto.

Where structural materials provided with thermal or acoustic insulation are desired, laminates of structural wood materials, metal sheets, linoleum, fiber reinforced plastic panels, resinous materials and the like may be prepared by adhesion of the inventive board material to the major surfaces thereof. This invention may be better understood by reference to the examples set forth below:

EXAMPLES

Raw Materials

Dead kenaf plants in the fields were harvested with the pith core having about 12 to 15 percent moisture content (MC). The fiber and core were separated in a three-section 12-m-long by 3.4-m-diameter drum containing baffles. About 80 to 90 percent of the intact, but fractured, core drops out of the early stages of the rotating drum. A conveyor belt transports the core to a processor where it is hammermilled, screened and sized with conventional industrial equipment. For laboratory quantities, the core was fed through a hammermill with 6.3-mm (0.250-in.) screens, then through a small seed cleaner (series of screens). The core fibers are isotropic, woody, balsa-like material, and the particles are somewhat spherical in appearance when processed as just described. The inherent density of the kenaf core particles was about 218 kg/m$^3$ (13.6 lb/ft$^3$), and the bulk density of the particles was about 137 kg/m$^3$ (8.0 lb./ft$^3$ ovendry basis). The particle MC was reduced to 7 percent prior to panel manufacture.

A phenol-formaldehyde (PF) resin (resole-type) typically used to make oriented strandboard from southern pine and southern regional low- and medium density hardwoods was used as binder. The liquid resin (50% nonvolatile solids) was a product of Georgia-Pacific Resins, Inc. coded GP 3156 ResiStrand PF Resin. A wax was added that was a product of Industrial Raw Material Corp., Product Code: Indrawax 21.

Panel Manufacture

Core particles were weighted to yield an approximate 240 kg/m$^3$ (15 lb./ft.$^3$) board at 7 percent MC. The board size was 610 by 610 mm (24 by 24 in.) and 22 mm (⅞ in.) thick. The liquid resin (200 mPA·s viscosity) was applied with a disc-spray atomizer (Coil Industries EL-2 Atomizer) at 1047 rad/s (10,000 rpm). The wax, which is solid at ambient temperatures, was heated (60° C.) and applied with a laboratory-built air-spray system at 172 kPa (25 psi) pressure. The resin adhesive was applied at 4 percent resin solids and the wax at 1 percent solids, particle ovendry weight basis. The mat configuration was homogeneous and was formed by hand distribution after the resin/wax applications.

The assembly time (time from resin application to panel full hot-press pressure) was 20 to 30 minutes. The hot-press platens were 204° C. (400° F.). The press pressure was applied to metal stops (22 mm thick) with decompression over the last 30 seconds of the cycle). Panels were made at two press times (7.4 and 5.7 min.) for comparison. A thermocouple wire was inserted to determine the panel-center temperature gradient over time in the hot-press.

Properties Tests

The boards were cut into specimens suitable for testing strength properties (internal bond, modulus of rupture, modulus of elasticity, and compression strength), dimensional stability (thickness swell and linear expansion after 2- and 24-hr. water-soak tests), and water absorption properties (after 2- and 24-hr. water-soak tests). Two panels were tested for thermal properties (ASTM C518-91) and acoustical properties (ASTM C384-90a).

Panel Manufacture

No difficulties were encountered during the processing of the boards. The resin and wax applications, panel forming, and hot-press cycle seemed routine for lignocellulosic materials. The choice of a PF resin was one of convenience. Other resin binders would presumably have been suitable, including MDI, which would allow gluing the core as harvested at 13 to 15 percent MC. The thickness of the panels after MC equalization was approximately 20 mm (a loss of about 2 mm from the metal stop thickness). The actual panel densities averaged 256 kg/m$^3$ (16 lb./ft$^3$).

Strength Properties

The panel internal bonds (Table 1) ranged from 110 to 214 kPa (16 to 31 psi) in comparison to industrial boards of 29 kPa (4.2 psi). For a panel of this density, the internal bonds were apparently quite good. The panel modulus of rupture (Table 1) ranged between 683 to 1200 kPa (99 to 174 psi). These results are similar to the 965 to 1380 kPa (140 to 200 psi) values for insulation boards of wood-based materials. The panel modulus of elasticity (Table 1) ranged between 186 to 420 MPa (27,000 to 61,000 psi). While MOE is not normally applicable to cellulosic fiber boards, insulation deck types have minimum values of 276 MPa (40,000 psi). Panel compression parallel to the surface or maximum crushing strength (Table 1) ranged between 993 to 1239 kPa (144 to 179 psi).

Dimensional Stability Properties

In spite of the very high water absorption due to porosity, the thickness swell values (Table 1) were not inordinately high: 12 to 23 percent after 2 hours of soaking and 17 to 28 percent after 24 hours of soaking. The linear expansion properties (Table 1) for the panels ranged between 0.5 to 1.7 percent after a 2-hour water-soak and 1.3 to 2.5 percent after a 24-hour water-soak. The 0.5 percent linear expansion is comparable to wood-based insulation boards tested with a 50 to 90 percent relative humidity.

Thermal Test

The apparent thermal conductivity (k) of the kenaf panels (tested according to test method ASTM C518-91) ranged between 0.061 to 0.065 W m$^{-1}$ K$^{-1}$ (watt per meter kelvin) (0.426–0.452 BTU in./hr. ft$^2$ °F.). These values relate to an apparent thermal resistivity (R) of 1.95 to 2.21 per 25.4 mm (1 in.) of thickness, comparing favorably with some commercial tiles and insulating sheathing materials. For instance, the k-value for structural softwood or plywood is about 0.115 W m$^{-1}$ K$^{-1}$ (0.80 BTU in./hr. ft.$^2$ °F.) and for glass wool insulation about 0.036 W m$^{-1}$ K$^{-1}$ (0.25 BTU in./hr. ft.$^2$ °F.).

Acoustical Test

The acoustical property of the representative panel (tested according to test method ASTM C384-90a) yielded a normal absorption coefficient ($\alpha_n$) range of 0.07 to 0.26 for a frequency range of 125 to 4000 Hz, respectively (Table 2). These results are shown in comparison to other materials tested by the same laboratory (Table 2).

Surface Upgrades

Low-density panels (240 kg m$^{-3}$ or 15 lb/ft$^3$) made of kenaf core (pith) materials may be upgraded with a wide array of overlays. The panel surfaces may be improved in smoothness and uniformity prior to overlay application, if desirable, by using kenaf fines in the surface layers or by sanding the surfaces. In this work, the surfaces of a series 22-mm (⅞-in.) kenaf core panels were left unsanded, and a similar thickness series were sanded at a local furniture plant using their routine sanding equipment. The sanded kenaf core panels were easily processed with high quality surfaces. The kenaf particles were bonded with liquid UF, PF and PMDI resin adhesives, with no processing problems.

Some unsanded panels were bonded to a 3.2-mm (0.125-in.) floor tile (KENTILE) using a Formica contact cement adhesive that was conveniently available, with excellent results and appearance.

Yellow-poplar veneers (2-mm thickness) were bonded to 19-mm kenaf core panels using two layers of a phenolic paper glueline material (Dyno Overlays, Inc.). The paper gluelines were used simply for convenience, and were hot-press cured at 141° C. (285° F.) for ten minutes under 552 kPa (80 psi) pressure.

Simpson Select 28-303 paint-grade medium-density overlay (MDO) provided a good surface upgrade for kenaf core panels. The Select 28-303 MDO is a phenolic resin impregnated kraft paper designed for general use overlay of wood-based substrates requiring a paintable surface. It is back-coated with a thermosetting phenolic adhesive formulated for bonding to wood. The thickness of this overlay is about 0.46 mm (0.018 in.) thick, contains 28% resin solids and has a natural kraft paper color. The overlay was cured in a hot press at a temperature of 141° C. (285° F.) for six minutes under 552 kPa (80 psi) pressure.

Dyno Natural Oak polyester woodgrain overlay also makes an attractive surface upgrade for kenaf core panels. This overlay is only 0.14 mm (0.0055 in.) thick and the substrate surface must be very smooth to prevent telegraphing. A Dyno release sheet (code 42-960) was used to prevent sticking of the overlay to the metal platens. The hot press conditions were the same as the MDO conditions.

TABLE 1

Test results of properties of kenaf core panels

| Property | Test results |
| --- | --- |
| Density[a] | |
| (kg/m$^3$) | 274 to 264 |
| (lb./ft.$^3$) | 15.4 to 16.5 |
| Internal bond[a] | |
| (kPa) | 110 to 214 |
| (psi) | 16 to 31 |
| Modulus of rupture[a] | |
| (kPa) | 683 to 1200 |
| (psi) | 99 to 174 |
| Modulus of elasticity[b] | |
| MPa | 186 to 420 |
| psi (×1.000) | 27 to 61 |
| Compression parallel to surface[b] (maximum crushing strength) | |
| kPa | 993 to 1239 |
| psi | 144 to 179 |
| Thickness swell[a] | |
| 2-hr. water-soak (%) | 12 to 23 |
| 24-hr. water-soak (%) | 17 to 28 |
| Water absorption[a] | |
| 2-hr. water-soak (%) | 119 to 223 |
| 24-hr. water-soak (%) | 246 to 325 |
| Linear expansion[b] | |
| 2-hr. water-soak (%) | 6.5 to 1.7 |
| 24-hr. water-soak (%) | 1.3 to 2.5 |

[a]Range values for four panels.
[b]Range values for three panels.

TABLE 2

Comparison of normal absorption coefficient, $\alpha_n$ for kenaf board and other materials tested by the impedance tube method (ASTM C384).[a]

| Frequency (Hz) | 20-mm kenaf core board | 13-mm gypsum board | 16-mm nodulated soft texture tile |
| --- | --- | --- | --- |
| 125 | .07 | <.04 | .10 |

TABLE 2-continued

Comparison of normal absorption coefficient, $\alpha_n$ for kenaf board and other materials tested by the impedance tube method (ASTM C384).[a]

| Frequency (Hz) | 20-mm kenaf core board | 13-mm gypsum board | 16-mm nodulated soft texture tile |
|---|---|---|---|
| 250 | .17 | <.04 | .16 |
| 500 | .34 | .07 | .30 |
| 1,000 | .49 | .06 | .52 |
| 2,000 | .29 | .04 | .38 |
| 4,000 | .26 | <.04 | .35 |

[a]The maximum normal absorption coefficient is 1.0. The higher the number in the table, the greater the sound absorbance.

The invention has been described generically, and by reference to specific examples. The examples are not, and should not be considered limiting, save for limitations appearing in the claims set forth below. In particular, material sizes, resin selections, density, compression values and the like may easily be modified by those of ordinary skill in the art, without the exercise of inventive faculty. Such subject matter remains within the scope of the claims as presented.

What is claimed is:

1. A composite comprising a press board consisting essentially of particulate kenaf core having an average particle size no greater than 1 inch in diameter and 4 inches in length and a cured binder in an amount of 2–15 percent, by weight, on the basis of kenaf core weight prior to curing.

2. The composite of claim 1, further comprising a facing adhered to at least one surface of said press board.

3. The composite of claim 1, wherein said press board has a density of 200–300 kg/m$^3$.

4. The composite of claim 1, wherein said composite material is an acoustical insulation tile.

5. The composite of claim 1, wherein said composite is a thermal insulation panel.

6. The composite of claim 1, wherein said press board further comprises at least one of a wax or a colorant.

7. The composite of claim 1, wherein said binder is a thermosetting or thermoplastic or cold-set binder.

8. The composite claim 7, wherein said binder is thermoplastic and selected from the group consisting of vinyl binders, polyester binders, polyethylene binders and mixtures thereof.

9. The composite of claim 8, wherein said thermoplastic binder comprises recycled plastic materials.

10. The composite of claim 7, wherein said binder is a cold set binder and selected from the group consisting of binders comprising protein, binders comprising carbohydrate, cements and mixtures thereof.

11. The composite of claim 7, wherein said binder is thermosetting and selected from the group consisting of phenol-formaldehyde binders, urea-formaldehyde binders, urea-phenolformaldehyde binders, isocyanate binders and mixtures thereof.

12. A method of preparing the composite of claim 1, comprising the steps of:

1) separating kenaf core material from other material, said other material comprising kenaf bast fibers, and sizing said core material to an average particle size no greater than 1 inch in diameter and 4 inches in length, 2) admixing 2–15 percent by weight of a cold setting or thermosetting or thermoplastic binder with said sized kenaf core material such that said binder and core material are thoroughly and homogeneously intermixed, 3) compressing said kenaf core and binder mixture to a dimension smaller than occupied by said mixture prior to compression, while heating said mixture to a temperature sufficient to cure said thermosetting or thermoplastic binder or allowing time for curing of said cold-setting binder, and 4) recovering said compressed, cured material after said compression step.

13. The process of claim 12, wherein said process further comprises adhering a facing to at least one surface of said compressed material.

* * * * *

UNITED STATES PATENT AND TRADEMARK OFFICE
CERTIFICATE OF CORRECTION

PATENT NO. : 5,492,756
DATED : February 20, 1996
INVENTOR(S) : Roy D. SEALE et al.

It is certified that error appears in the above-indentified patent and that said Letters Patent is hereby corrected as shown below:

On the title page, Item [73], the Assignee is written incorrectly. It should read:

--[73] Assignee: Mississippi State University, Mississippi State, Mississippi--

Signed and Sealed this

Eighteenth Day of June, 1996

*Attest:*

BRUCE LEHMAN

*Attesting Officer*     *Commissioner of Patents and Trademarks*